United States Patent [19]

Book

[11] 4,266,925
[45] May 12, 1981

[54] APPARATUS FOR SURFACE EMBOSSING MAN-MADE LIGNOCELLULOSIC BOARD

[75] Inventor: Niles E. E. Book deceased, late of Motala, Sweden, by Inga Book, administrator

[73] Assignee: AB Motala Verkstad, Motala, Sweden

[21] Appl. No.: 20,830

[22] Filed: Mar. 16, 1979

[51] Int. Cl.³ .............................................. A01J 21/00
[52] U.S. Cl. .................... 425/387.1; 425/388; 425/405 R; 425/DIG. 60
[58] Field of Search ............... 425/387.1, 388, 405 R, 425/DIG. 60

[56] References Cited

U.S. PATENT DOCUMENTS

| | | | |
|---|---|---|---|
| 3,476,377 | 11/1969 | Agrista et al. | 425/405 R |
| 3,705,248 | 12/1972 | Hill et al. | 425/405 R |
| 3,973,893 | 8/1976 | Camp | 425/405 R |
| 3,997,286 | 12/1976 | Gabrys | 425/405 R |
| 4,038,014 | 7/1977 | Dusza et al. | 425/405 R |

OTHER PUBLICATIONS

ISO Standards Handbood, 1970–"Units of Measurements".

Primary Examiner—Donald E. Czaja
Assistant Examiner—James R. Hall

[57] ABSTRACT

Apparatus for embossing preformed particle board retains the board in a desired position after insertion between a first and a second press plate (4;3) in a press and releases after pressing the board from the press plates. The product (7) is sucked tight against the first press plate (4) after being placed in a desired position in the press. The suction process takes place either directly or via an intermediate permeable means (12; 14) and is so adjusted that it will be sufficient to stip off the board from the second press plate (3). Subsequently, the suction force may be replaced by a pressure force, for releasing the board (7) from the first press plate (4) or the intermediate means (12; 14).

10 Claims, 6 Drawing Figures

APPARATUS FOR SURFACE EMBOSSING MAN-MADE LIGNOCELLULOSIC BOARD

The present invention relates to an apparatus for surface embossing consolidated, man-made, lignocellulosic board such as wet process and dry process fiberboard, particle board, etc.

It has long been known to emboss such board during the forming thereof by heat pressing with a patterned surface plate thereby producing more or less deep embossings of different wood grains, brick wall patterns etc, in the board surface.

It has also been proposed to use such pattern plates in a subsequent operation in a special press instead of during the actual manufacture of the board itself. A very high press temperature, about +300° C., must generally be used in this subsequent embossing operation, and most often a high pressure of 5–9 MPa as well, depending on the density of the board. Press time will be short, and two or three pressings per minute can be accommodated as a rule. Due to the high press temperature, which causes increased dark toning of the board in response to extended press time, it is important to have great repetitional accuracy in the pressing cycle, since otherwise there will be undesirable shifts in tone between successively embossed boards.

A difficult problem in this connection is the tendency of the board to adhere to the embossing plate after embossing, and to a certain extent also adhesion to the underlying press plate. This is minor when embossing hard fibreboard, and somewhat greater for buildingboard, especially if extra glue has been used in manufacture. Adhesion is severe when embossing chipboard and dryformed fibreboard.

No special method for releasing the boards is known, since the method is so new that it has so far only been applied in laboratory presses. In these cases the board has been pried away from the embossing plate manually, by inserting a thin object between the board and the plate. This method can naturally not be used industrially in the rapid press cycles used, and furthermore it can easily result in damage to the board. Neither is it acceptable to force in air between the board and the embossing plate from orifices in the latter to loosen the former. The air orifices in the embossing plate would leave unacceptable impressions in the pattern on the board, and the flow of air would produce an uneven temperature in the embossing plate which would result in tone shifts in successively embossed boards. On the contrary, it is desirable that the embossing plate be kept pressed against the press plate by vacuum between these two when the press is opened, in order to maintain the most even temperature possible in the embossing plate.

Another problem with the embossing operation is that the boards which are to be embossed are in a ready-cut delivery format or with negligible finishing allowances. It is therefore extremely important that each board be accurately located in relation to the embossing plate pattern in the press during the pressing operation so that the pattern is repeated alike from board to board. Positioning the board is done against mechanical stops, which must be withdrawn from the press during the embossing stroke. Due to the high press temperature, a thin gas film occurs between the board and the press plate below, as soon as the board is put in the press. The board can then glide completely without friction, making it impossible to position the board accurately. It has therefore been necessary up to now to place a steel wire cloth between the board and the underlying press plate to facilitate accurate position of the board. However, it is often desired to retain the smooth back surface of the board, in which case a steel wire cloth cannot be used because of the heavy marking of the board that it would cause.

The problems discussed above have been solved by the apparatus in accordance with the invention.

The invention will be better understood from the following detailed description of several representative embodiments, taken in conjunction with the accompanying drawings in which FIG. 1 is a side view of an embossing press, constructed according to the invention;

Figure 1:
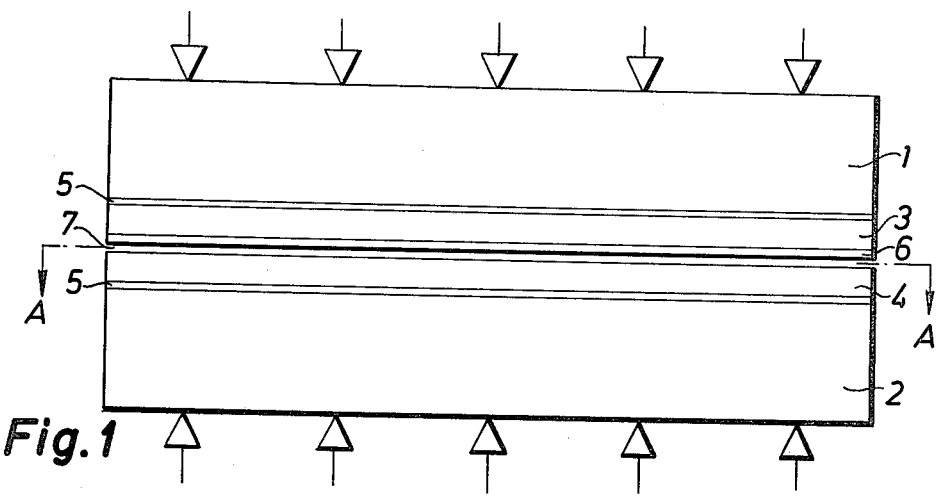

The press shown schematically in FIG. 1 consists of an upper press table 1 and a lower press table 2, an upper press plate 3 and a lower press plate 4. Heat insulating sheets 5 are inserted between the press tables and the respective press plates. A pattern or embossing matrix plate 6 is attached to the underside of the upper press plate 3. The board which is to be embossed is denoted by the numeral 7. The arrows denote press forces.

Figure 2:
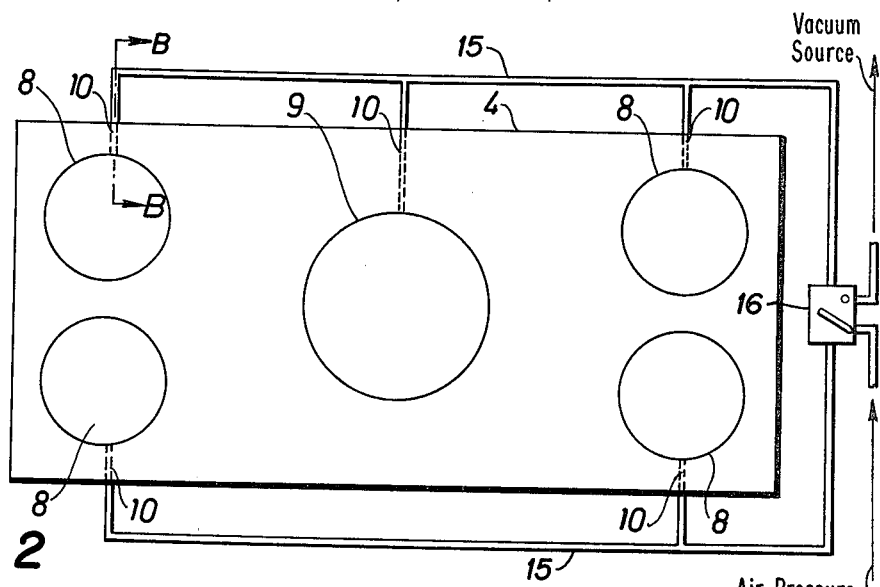
FIG. 2 is a plan view along the line A—A in FIG. 1, looking in the direction of the arrows.
Figure 3:
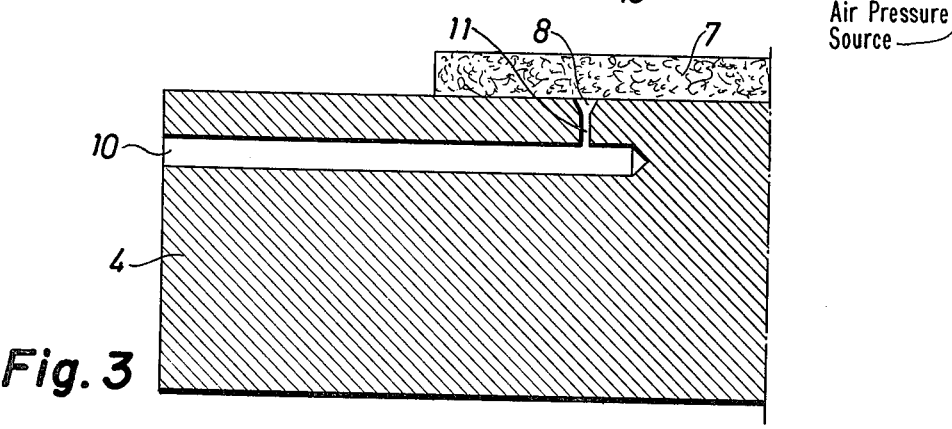
FIG. 3 is a vertical section along the line B—B in FIG. 2, looking in the direction of the arrows.

The lower press plate 4 is provided, as shown in FIG. 2, with circular grooves 8 and 9 in the upper face of the plate. Air passages 10 extend from the edge of the plate, and via apertures 11 open out into the grooves 8 and 9. The air passages 10 are connectible selectively to a vacuum system or to a source of air under pressure by the conduits 15 and controller 16, so that air can be evacuated from the grooves 8 and 9 or air at excess pressure can be supplied to said grooves. The grooves 8 and 9 are so located over the surface of the press plate that they are always covered by the board 7, which is to be embossed.

When the board 7 is inserted in the press in the desired position, air is evacuated from the grooves 8 and 9. Even if it were to be somewhat uneven on its underside, the board will then be sucked tightly against the press plate 4 with sufficiently large force for it to keep itself located. In conjunction with the subsequent embossing operation, which is done at high surface pressure and high temperature, the remaining air between the board and the press plate 4 will be pressed out, and the irregularities on the underside of the board will be smoothed out. When the press is opened, there is therefore a large vacuum between the board and the press plate 4, especially inwardly of the grooves 8 and 9. By aid of this vacuum, the board is pulled away from the matrix plate 6. While the press is still only opened a trifle, so that the board has come away from the matrix plate, the vacuum between the board and press plate is changed to excess pressure, by compressed air being supplied to the passages 10. The board then releases its adhesion to the press plate 4. It is important that the press be only opened a very small amount in this operation, otherwise the majority of the board will be lifted so high that sufficient air pressure will not be obtained for releasing an adhered corner. The board can subsequently be conveyed away from the press.

The form of grooves 8 and 9 shown is only an example, and these grooves can naturally be given completely different forms while maintaining the same good function.

Figure 4:
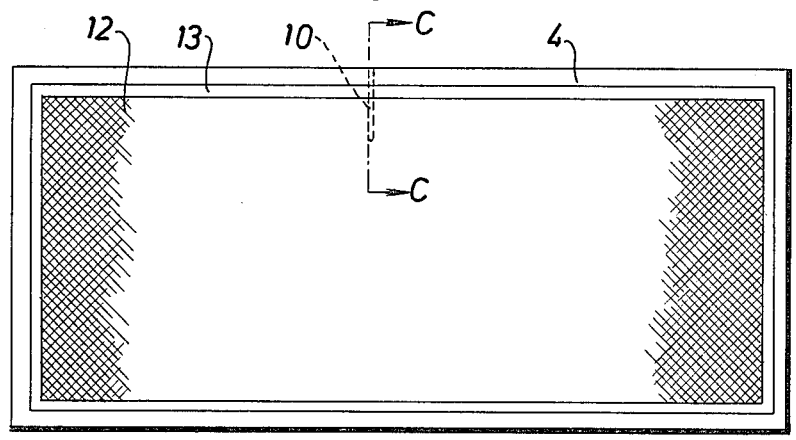
FIG. 4 is a plan view corresponding to FIG. 2, but with a foraminous sheet over the lower press plate.
Figure 5:
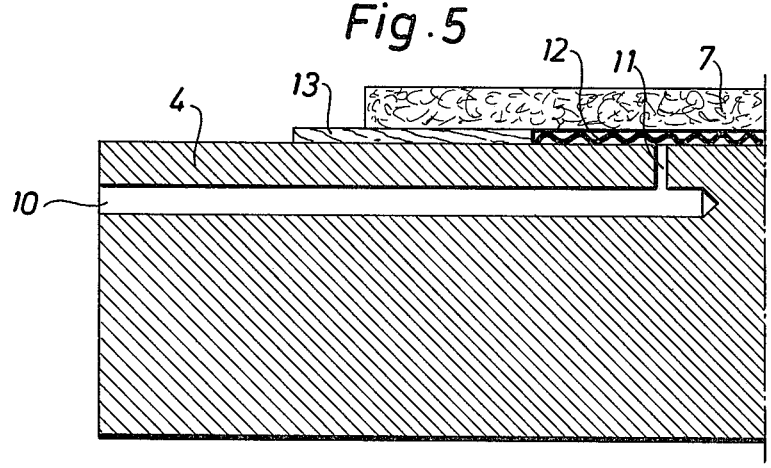
FIG. 5 is a vertical section along the line C—C in FIG. 4, looking in the direction of the arrows.

In some cases it has been found that the embossed boards become curved. For this type of board or pattern, it has been necessary to place a steel wire cloth 12 or other permeable or foraminous means, e.g. a perforated sheet, between the board 7 and the press plate 4, so that after being embossed the boards will retain their flatness (Cf FIGS. 4 and 5). To maintain a vacuum between the board 7 and the press plate 4 it will then be necessary to seal off the mesh in the wire with a frame 13 around the cloth 12. The sealing frame 13 can be made from heat-resistant cement or steel strip with the same thickness as the cloth, to which it can be spot welded. The air passages 10 and 11 must, of course, lie within the area bounded by the frame 13, as shown in FIG. 5.

Figure 6:
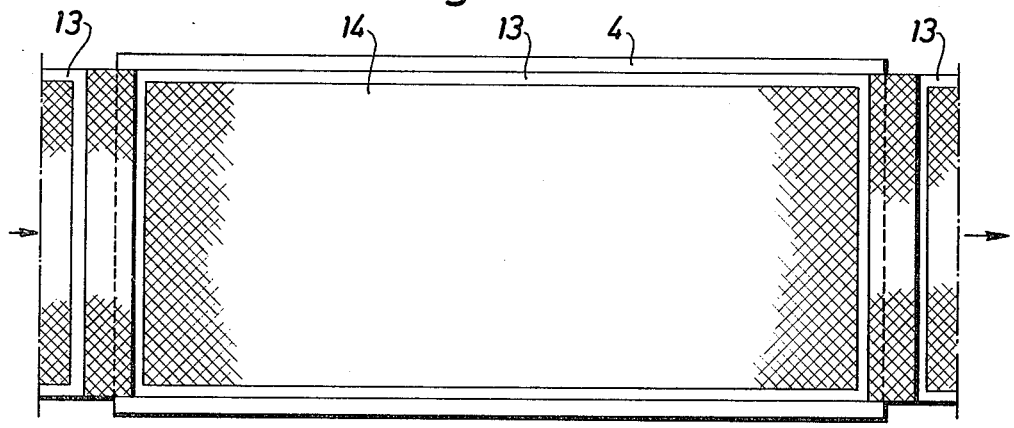
FIG. 6 is a plan view of a variant of the embodiment in FIG. 4 in which the foraminous sheet is in the form of an endless belt.

If the wire 12 with the frame 13 are retained stationary in the press, i.e. with the frame attached to the press plate 4, pressing is carried out in exactly the same way as described hereinbefore. If, on the other hand, the wire is to be taken out of the press as well, and endless loop 14 (FIG. 6) of it is used instead, with a plurality of frames 13. In the latter case, vacuum is used as before for separating the board from the embossing plate. The board subsequently accompanies the wire out of the press and is separated from the wire when the latter begins to move downwards on its way towards returning to the press.

When adhesion of the board to the press plate is not so great a sufficiently high vacuum may be obtained without providing a sealing frame 13 for the finely woven thin wire 12 or 14.

The method of pulling the board away from the embossing plate by means of vacuum can naturally be applied to the situation where the embossing plate is at the bottom and attached to the press plate 4, with the board above, in which case corresponding grooves, air passages etc. are made in the overlying press plate.

The embodiment shown here, using a one-storey press, can be applied in its main principle to a multistorey press as well. Furthermore, the invention is here mainly intended for application in embossing press work but it can naturally also be applied to other similar press methods for other products.

What is claimed is:

1. In an apparatus for embossing a preformed particle board or the like comprising:
   press means including
   a first press plate shaped to support a preformed board and a cooperating opposed member,
   said press plate and opposed member being adapted to be moved towards and away from one another to close and open said press means, respectively,
   the improvement comprising
   means to establish suction between a board positioned on said first press plate and an adjacent supporting surface thereof to retain the board in fixed position on said first press plate, wherein said board is stripped away from said opposed member when the press is opened following an embossing operation, and
   means for releasing said suction and establishing fluid pressure between said board and the adjacent supporting surface of the press plate when the press is opened and the board and opposed member are in nearby closely spaced relation, to free the board from the adjacent supporting surface of the press plate.

2. Apparatus as defined in claim 1 in which the surface of the first press plate facing the opposed member is provided with a plurality of grooves communicating with a plurality of passages and means is provided for connecting the passages selectively to a source of suction or to a source of fluid under pressure to establish suction or fluid pressure between a board positioned on said press plate and the adjacent supporting surface thereof.

3. Apparatus as defined in claim 2 together with a perforated sheet disposed over said supporting surface of the first press plate.

4. Apparatus as defined in claim 3 in which the perforated sheet is firmly fixed to said supporting surface of the first press plate and the perforated area of said sheet is substantially coextensive with a board to be embossed.

5. Apparatus as defined in claim 3 in which the perforated sheet is movable in relation to said first press plate and is adapted to feed boards successively into and out of said press means.

6. Apparatus as defined in claim 5 in which the perforated sheet is in the form of an endless conveyor loop movable stepwise around said first press plate with a portion thereof overlying said supporting surface of said first press plate.

7. Apparatus as defined in claim 3 or claim 5 in which the perforated sheet has sealing means adapted to cooperate with a board positioned thereon and the adjacent supporting surface of the first plate means to form a chamber in which vacuum or fluid pressure is adapted to be established through said grooves formed in the surface of the first plate means.

8. Apparatus as defined in claim 6 in which the perforated sheet comprises a plurality of perforated areas each substantially coextensive with the surface of a board to be embossed and spaced apart in the direction of movement of said sheet.

9. Apparatus as defined in claim 8 in which each perforated area is bounded by sealing means adapted to cooperate with a board positioned between the first plate means and the cooperating opposed member and the adjacent support surface of the first plate means to form a chamber in which vacuum or fluid pressure is adapted to be established through said grooves formed in the surface of said first plate means.

10. In a method for embossing a preformed particle board or the like in press means including a first press plate shaped to support a preformed board and a cooperating opposed member mounted for relative movement towards and away from one another to close and open said press means, the steps of establishing suction between a surface of said first press means and a preformed board thereon to retain the board thereon so that the board is stripped away from said opposed member when the press is opened after an embossing operation, and releasing said suction and establishing fluid pressure between said board and the adjacent supporting surface of the press plate when the board and said opposed member are in nearby closely spaced relation after the press has been opened, to free the board from the adjacent supporting surface of the press plate.

* * * * *

UNITED STATES PATENT AND TRADEMARK OFFICE
CERTIFICATE OF CORRECTION

PATENT NO. : 4,266,925
DATED : May 12, 1981
INVENTOR(S) : Nils E.E.Book, deceased It is certified that error appears in the above—identified patent and that said Letters Patent is hereby corrected as shown below:

First page, Item 75, "Niles" should read --Nils--;
First page, following Item 22, insert:

--[30] Foreign Application Priority Data
April 4, 1978   Sweden   7803793-4--

First page, 2nd col,, line 5 of ABSTRACT, "product" should read --board--;
First page, line 9 of ABSTRACT, "stip" should read --strip--;

Col. 3, line 28, "and" should read --an--;
Col. 3, line 37, after "great" insert a comma; and
Col. 4, delete claim 10 (lines 53-67).

Signed and Sealed this

Twenty-fifth Day of August 1981

[SEAL]

Attest:

GERALD J. MOSSINGHOFF

Attesting Officer

Commissioner of Patents and Trademarks